United States Patent [19]

Martinez

[11] Patent Number: 5,538,588
[45] Date of Patent: Jul. 23, 1996

[54] HEAD FOR THE APPLICATION OF COMPOSITE BANDS

[76] Inventor: Manuel Torres Martinez, Sancho el Fuerte, 21, 31007 Pamplona, Spain

[21] Appl. No.: 348,174

[22] Filed: Nov. 28, 1994

[30] Foreign Application Priority Data

Nov. 30, 1993 [ES] Spain ..................... 9302506

[51] Int. Cl.⁶ ..................................... B32B 31/00
[52] U.S. Cl. ................. 156/574; 156/353; 156/540; 156/577; 156/581
[58] Field of Search ................. 156/574, 577, 156/391, 353, 361, 510, 523, 555, 581, 475, 540

[56] References Cited

U.S. PATENT DOCUMENTS

| 4,292,108 | 9/1981 | Weiss et al. ................ 156/523 X |
| 4,693,177 | 9/1987 | Pankoke ...................... 156/555 X |
| 4,696,707 | 9/1987 | Lewis et al. . | |
| 4,701,240 | 10/1987 | Kraemer et al. .............. 156/555 |
| 4,915,771 | 4/1990 | O'Brien et al. ............... 156/574 |
| 5,015,326 | 5/1991 | Frank ........................ 156/574 X |

FOREIGN PATENT DOCUMENTS

0333010 9/1989 European Pat. Off. .
9302167 10/1993 Spain .

*Primary Examiner*—James Engel
*Attorney, Agent, or Firm*—Nath & Associates; Gary M. Nath

[57] ABSTRACT

A head for the application of composite bands, of the type which has a compacting group which incorporates rollers intended to press on a composite band to make it conform to the corresponding piece, the head having a pair of rollers (12.1) and (12.2) mounted in diametrical opposition on a gyratory support, each roller (12.1) or (12.2) being formed by a multiplicity of identical pieces (2.4) which are maintained in position by tubular pipes (12.5) from which a pressurized fluid flows.

9 Claims, 14 Drawing Sheets

ND FOR THE APPLICATION OF
COMPOSITE BANDS

DESCRIPTION

The present invention relates to a head for the application of bands or laminar strips of carbon fibre, called composite bands, through the compact superimposition of which bands there is formed fabric or fibre reinforced laminated pieces which are used, for example, in the aeronautical and naval industries.

There is reference to this type of head in U.S. Pat. No. 4,696,707 of the Ingersoll Milling Company, as well as in European patent 0333010 of Cincinnati Milacron Inc, and Spanish patent number 9302167 which together with its Addition Certificate 9302506 belongs to the same applicant as the present invention.

Each such head incorporates compacting rollers which are set up in the head element which finally impinges on the composite band to be applied, pressing down on it so that it is fixed on another or other lower bands and in order to establish also a compacting to make uniform, in the best way possible, the presence of the band on the surface of the fabric which is being fashioned and to avoid at the same time the production of small air bubbles between the composite bands since for some applications, as for example in the aeronautical sector, such air bubbles make the fabric containing them unusable.

In order that the most effective compacting should be possible it has been proved that it is very important to get the compacting element to adapt itself to the possible curves and irregularities which the fabric has on its surface and to get the compacting element to push on the composite band with a force which may be regulated.

With this aim it is known to produce these compacting elements with a segmented structure, in which the different segments are maintained in their position by mechanical means which seriously complicate the fabrication of the same and reduce their operative reliability.

In the Spanish Addition Certificate 9302506 there is disclosed an embodiment of each compacting element by a correlation of identical pieces, arranged next to each other in alignment, but in such a way that each piece may be displaced by sliding with respect to the contiguous piece or pieces, in a movement which is independent thereof. In order to achieve this, such pieces have depressions which form housings for tubular pipes from whence a pressurized fluid flows.

These tubular pipes are common to all the pieces of a single compacting element and have sufficient rigidity to maintain the different pieces in a stable position of alignment, one next to the other, but at the same time are flexible, so that the pressure against one of these pieces produces its displacement by elastic deformation of the corresponding tubular pipe or pipes, which absorb the displacement of each piece; while on ceasing to push against it, the pressurized fluid inside the tubular pipes returns them and the piece to the stable startling position.

In this way it happens that the pieces which must be realised directly by the compacting of the composite band may be displaced amongst themselves to have finally an attack front which adapts itself very well to the different curves and/or irregularities of the fabric which is being fashioned. But also, this is achieved with a solution which is supremely simple both in terms of construction and function, since each compacting element only has, as basic components, the compacting pieces and the tubular pipes, this construction eliminating the internal mechanical complexity which these elements have in traditional constructions.

On the other hand, it is sufficient to vary the pressure of the fluid inside the aforementioned tubular pipes, in order thus to vary the compacting pressure, thereby regulating this characteristic in accordance with variables such as speed of work, type of material to be compacted, etc.

This constructional solution for the compacting elements is retained in the present invention, but in addition other fundamental characteristics have been provided, i.e., the head has a system for supplying the composite band which allows a constant tension to be achieved in the band.

In effect, in traditional solutions, the composite band is rolled around a spool which is mounted in a spool holder, whose accelerations and decelerations affected the tension of the band, preventing the obtaining of a constant tension. Moreover, given that the mass of the spool of the composite changes as the band is unwound, it is not feasible to make calculations from the spool holders, to achieve a constant tension in the composite band.

In accordance with the present invention the spool of composite is arranged on a spool holder, but now, at the exit of this spool there are arranged motorised rollers situated at the same height, over which the composite band passes, said band defining a supply loop between the rollers.

Each one of these rollers has an internal vacuum system to fix it to the composite band and given that the mass of these rollers remains constant, as with the piece of the composite band which passes over them, now it is possible to establish the corresponding calculations in relation to the rollers so that the tension of the composite band at the exit from the second roller remains constant, without being affected by the accelerations and decelerations of the spool of composite.

Another fundamental aspect in these heads is that of the alignment of the composite band. In effect, if the band is unaligned errors will continue to be added or taken away according to the advance or retreat of the head, but, in any case, such errors will continue to accumulate.

In accordance with the present invention the alignment of the composite band is achieved through both ingenious mechanisms for mechanical auto-alignment and through an alignment roller situated just in front of the compacting assembly, it having been foreseen that behind the compacting assembly, from whence exits the band of paper which backs the composite band, is situated, optionally, another alignment roller for this band of backing paper.

Another important characteristic of the present invention are the cutting means, which must follow the cutting lines of the composite band when this is already situated on the backing paper band, following any straight, curved or mixed line path.

For this, two rotary cutting mechanisms are arranged, each of which has a screw and nut device for its transverse displacements in relation to the composite band. Moreover it is moved vertically in order to regulate the depth of cut of the blade and in rotation around the longitudinal axis of the mechanism, in order to select the orientation; all of which allows the following of any cutting path.

These mechanisms have the peculiarity that the cutting edge of the blade is aligned with the longitudinal axis of the mechanism, which allows great precision to be achieved in the cut and moreover, the rotary blade defines its cutting edge from an isosceles trapezoidal cross section, in which the base coincides in alignment with the longitudinal axis of the mechanism, which allows successive sharpenings of the blade without its cutting edge losing the alignment with the longitudinal axis of the mechanism, which avoids adjustments in the position of the blade each time it is sharpened, thus allowing its automatic sharpening. This is an important characteristic, since the composite band has an abrasive character, which brings with it the periodic need to sharpen the cutting blades.

Also and in relation to the cutting blades, it has been foreseen that their rotation is achieved in both directions; in such a way that on attacking the composite band at one of its edges it turns in a direction to put the fibres of the composite towards the inside of the band, avoiding fibres remaining towards the outside, but on coming closer to the opposite edge it changes its turning direction to achieve the same end on the other side.

On the other hand, also emphasised in the object of the present invention is the arrangement of the compacting elements on a support simply removable with them; in order to proceed thus to the change of the compacting elements when the width of the composite band or the characteristics of the work change.

Finally, it should be noted that next to the alignment roller, which is arranged in front of the compacting elements, is situated the mechanism which brings about the detachment of the composite band waste; in such a way that such waste may be removed by collecting means.

With these solutions there is achieved a head capable of working with composite bands with greater tolerances than those demanded until now, but moreover with the peculiarity that the head, since it has been brought about that the composite band has a constant tension and is perfectly aligned, achieves great precision and quality in the application of such composite bands. These characteristics together with the rotary cutting mechanism and its possibility of automatic sharpening; together with the possibility for a rapid change of compacting elements, and the actual composition of these and together with the characteristics of the collector, give the head a character which is its own and different from all those known to date.

The invention is diagrammatically illustrated, by way of example, in the accompanying drawings, in which.

Figure 14:
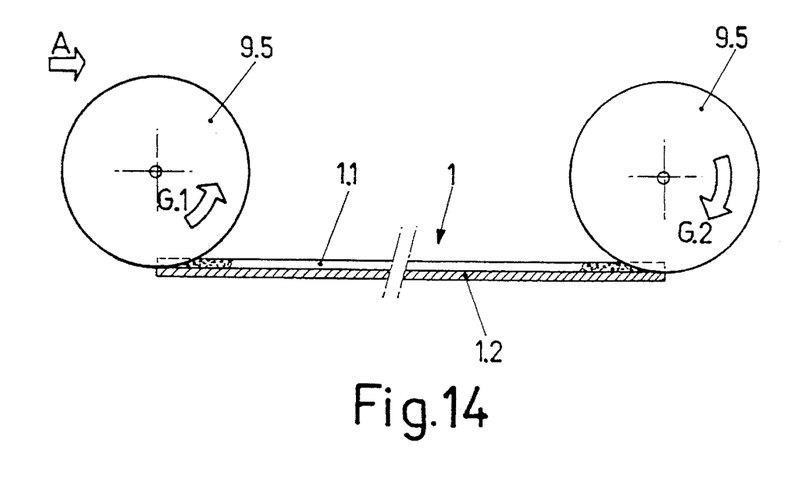
FIG. 14 is a schematic view which shows the change in rotation direction of the blade (9.5)

The object of the present invention is a head for the application of composite bands. As is known in this type of head, see FIG. 3 the corresponding spool (2), formed by the winding of a band (1) made of a composite strip (1.1), together with its corresponding backing paper (1.2), see FIG. 14 is mounted on a spool holder (3) which receives movement by means of the transmission (4).

Figure 3:
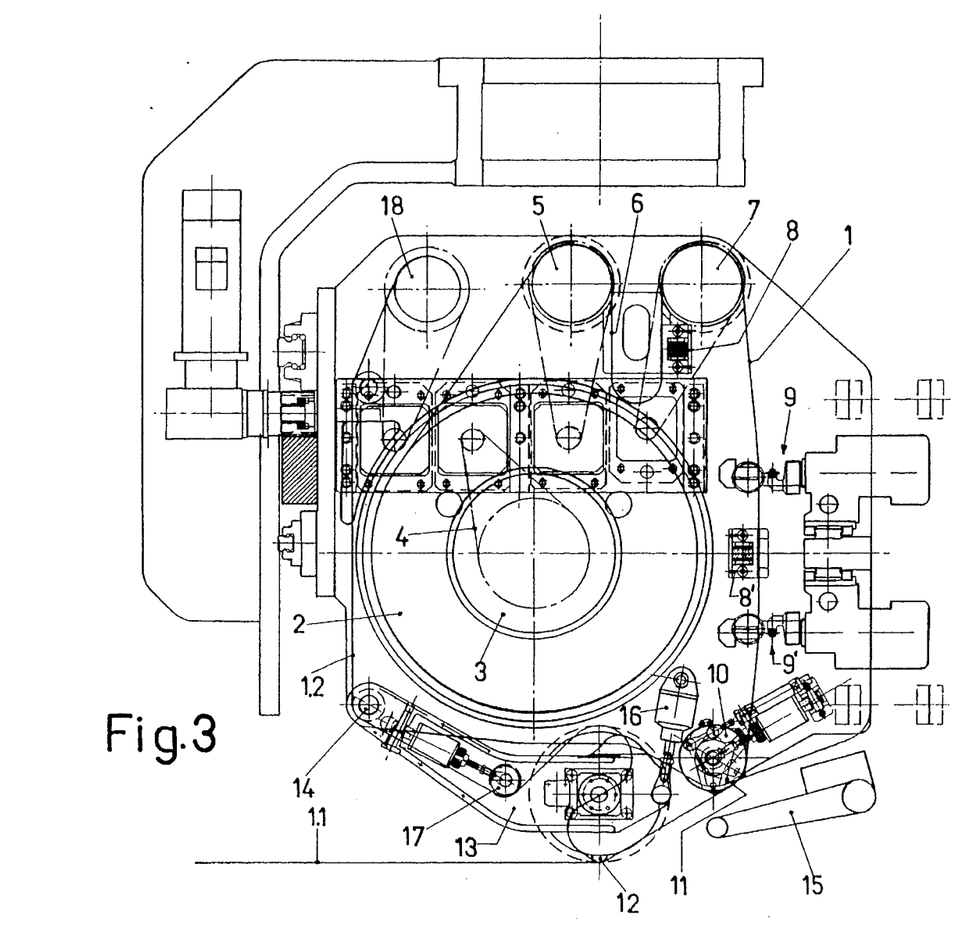
FIG. 3 is a view as in FIG. 2, but with the band (1) already arranged in the head.

The band (1) extends to a roller (5), passing over it to descend forming a loop (6) and ascend again to a second roller (7). In front of this roller (7) is arranged a mechanical self centering device (8) for the band Continuing on the band passes through an area where there are both mechanical rotary cutting mechanisms (9 and 9'), between which is arranged another mechanical self centering device (8') for the band (1).

Once through the area of the rotary cutting mechanisms (9 or 9') the band is directed towards a roller (10) which also establishes a centering of the band (1) and which has a mechanism (11) for removing waste from the composite (1.1) of the band (1).

Finally and in an assembly swinging with respect to a shaft (14) is arranged a frame (13) which carries the compacting means (12).

Now the general composition of the head has been described, we go on to describe the actual composition of each of its components, to complete the description of its functional character.

Figure 4:
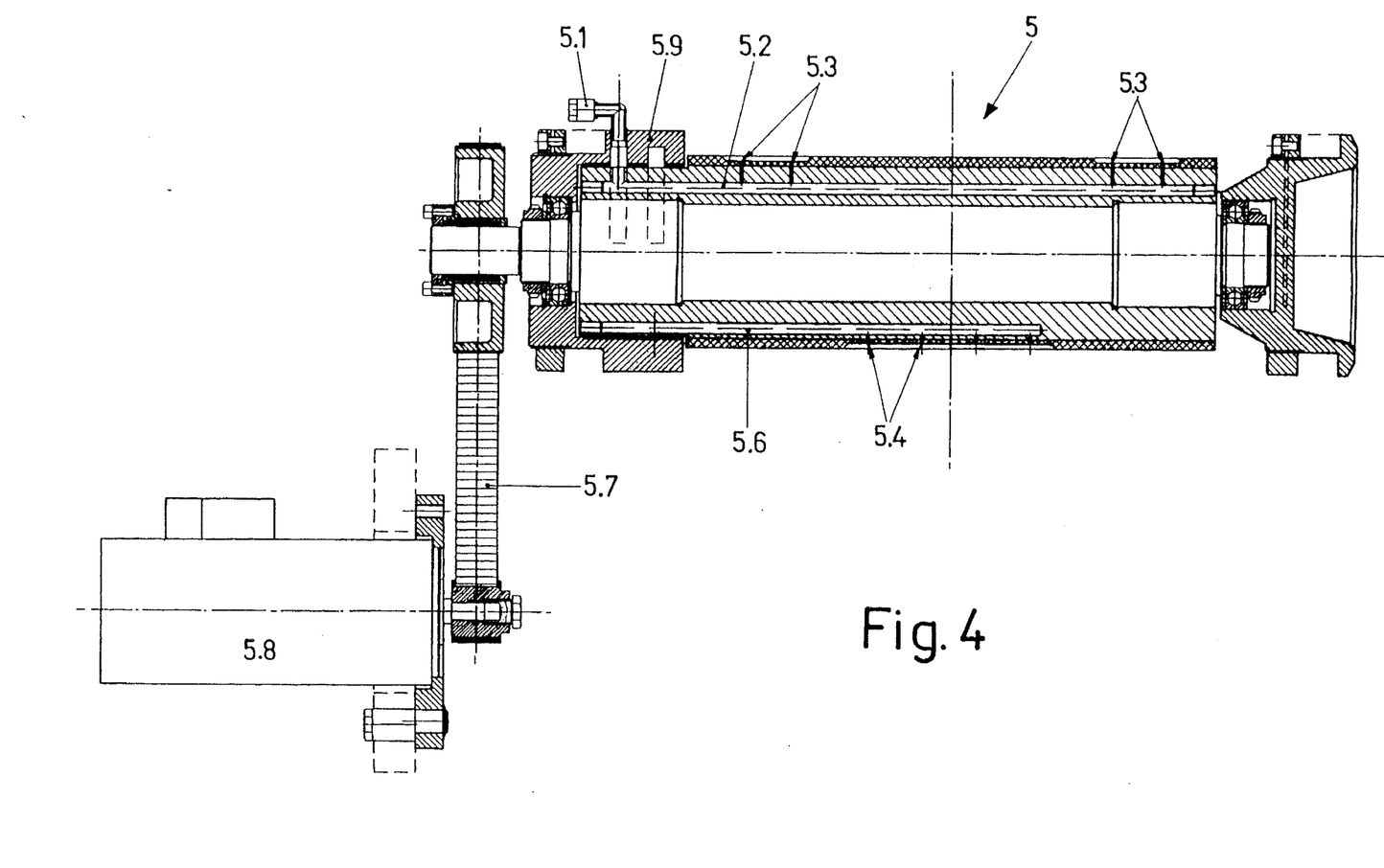
FIG. 4 shows a view in longitudinal cross section of the roller (5), together with its motor means.

Starting with the roller (5), in FIG. 4 it can be seen that it receives movement from a motor (5.8) and a transmission (5.7). A vacuum connection (5.1) is connected to a vacuum collector (5.9) shown in FIGS. 8 and 9. This vacuum collector (5.9) communicates with conduits (5.2 and 5,6) which extend along the roller (5).

Figure 5:
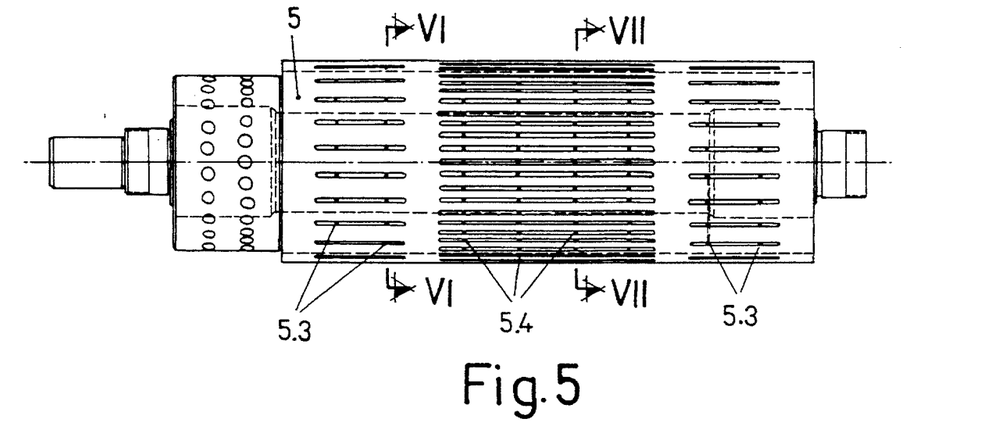
FIG. 5 is a view of the roller (5) in elevation.
Figure 6:
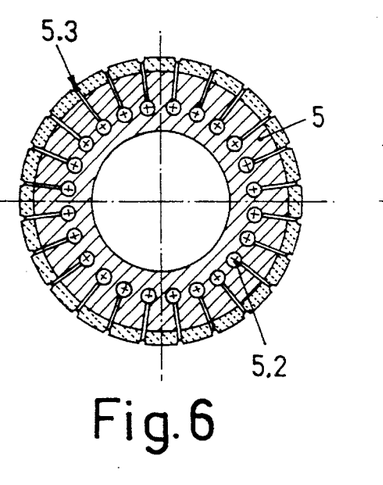
FIG. 6 shows the transverse cross section VI—VI as indicated in FIG. 5.
Figure 7:
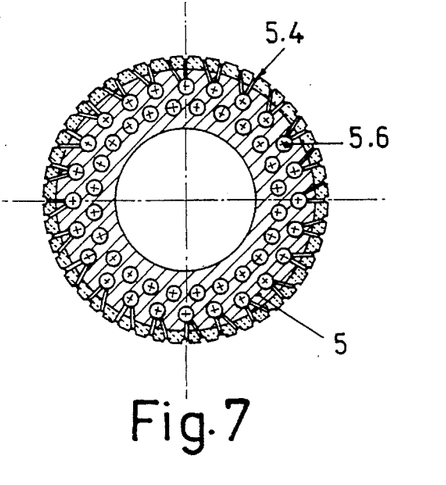
FIG. 7 is the transverse cross section VII—VII as indicated in FIG. 5.

The conduits (5.2) communicate with radial branches (5.3) at the end regions of the rollers, arranged in such a way as to underlie the edges of a composite band (1) of 300 mm; while the conduits (5.6) communicate with branches (5.4) which extend along the roller 5 in the central region of the roller and situated to underlie a composite band (1) having a band width of 150 mm (see FIGS. 5, 6 and 7).

Figure 8:
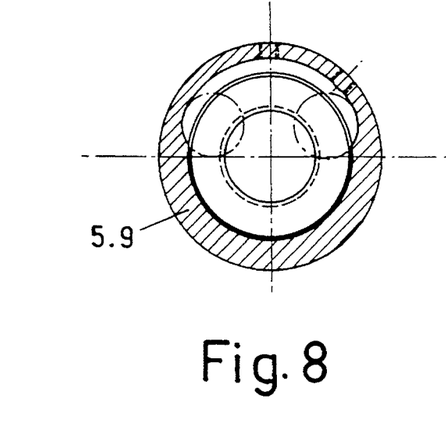
FIG. 8 shows the cross section VIII—VIII indicated in FIG. 9.
Figure 9:
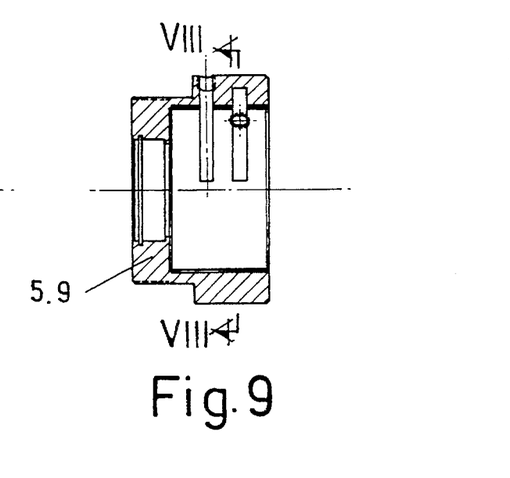
FIG. 9 is a longitudinal cross section of the vacuum collector (5.9) of the roller (5)

In the transverse section of the vacuum collector (5.9) of the roller (5) shown in FIG. 8, it can be seen that the branches (5.3 and 5.4) receive the vacuum in a run close to 180° which coincides with the part on which the band (1) rests against the roller (5), the roller (5) thus constituting traction means for the composite band.

The roller (7) has the same construction as the roller (5). Uniquely, one of the two rollers (5 or 7) may have a controlled shaft to give information to the system assembly. Likewise the rollers (5 and 7) may be situated for varying selectively the distance between the two, in order thereby to vary the radius of the loop (6) of the band (1) in accordance with the characteristics of the latter.

Figure 10:
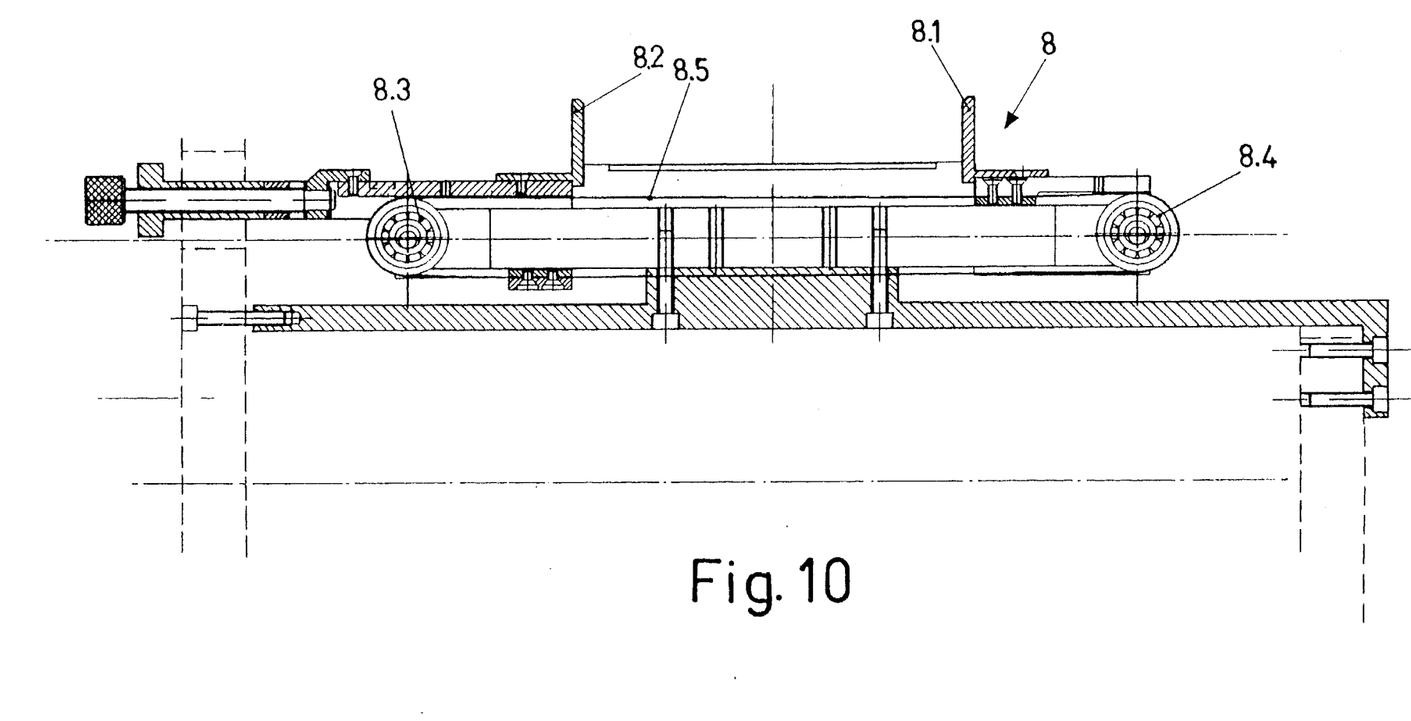
FIG. 10 is an elevation in partial cross section of one of the self centring mechanisms (8)

Next to the roller (7) is situated the first self centering mechanism (8) for the band (1). As can be seen in FIG. 10 between both rollers (8.3) and (8.4) there is mounted a belt (8.5).

At the upper part of the belt (8.5) is fixed a lateral guide (8.1) for the band (1); while at the lower part of the belt (8.5) is attached another lateral guide (8.2) for the band (1). In this way the two lateral guides (8.1 and 8.2) move always in synchronisation in the direction of their mutual approximation or separation. In this way it is possible that the theoretical median plane between the guides (8.1 and 8.2) coincides always with the central longitudinal plane of the band (1), independently of the of the composite band. The movement of the guides (8.1) and (8.2) in their direction of separation is achieved against the action of spring means not shown.

In this way, it is assured that the central longitudinal plane of the band (1) is perfectly centered and, from it may be taken the information for the work to be undertaken.

It has been foreseen that the axis of the roller (8.3) has an eccentricity in order to maintain an adequate tension in the belt (8.5).

Figure 11:
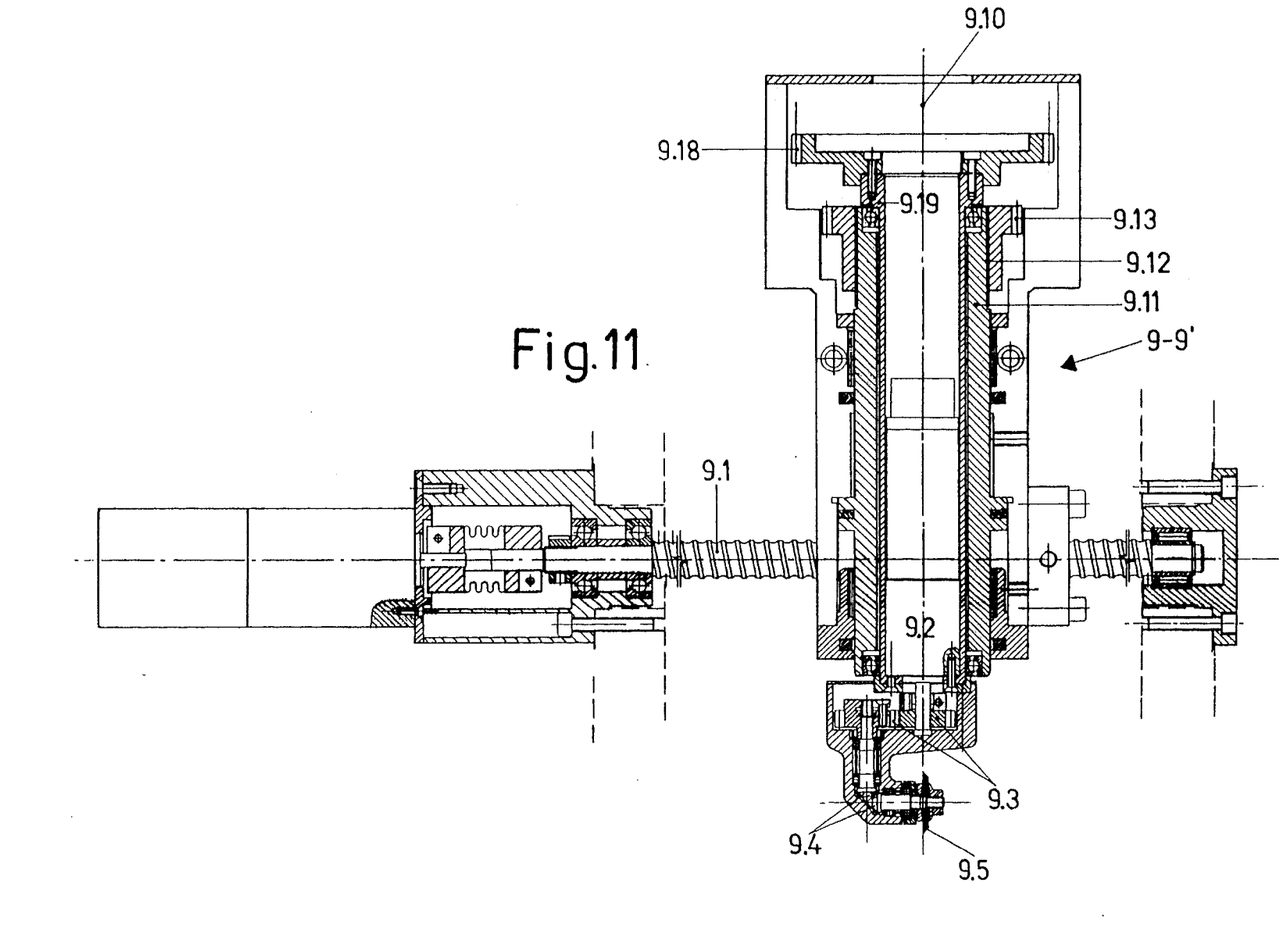
FIG. 11 is a view in longitudinal cross section of one of the rotary cutting mechanisms (9 or 9')
Figure 12:
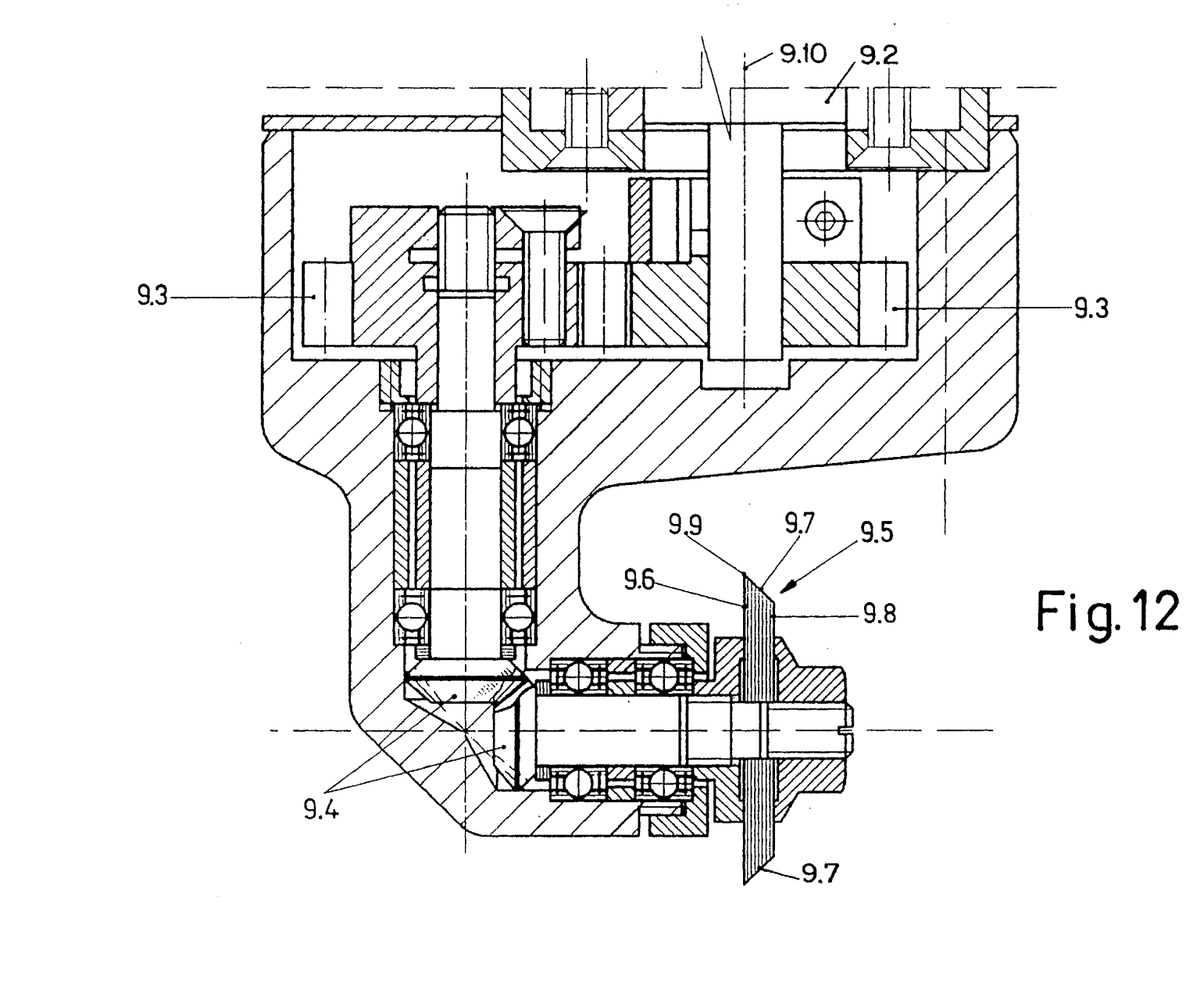
FIG. 12 is a view in enlarged detail of the part corresponding to the end of the blade (9.5) of the cutting mechanism (9 or 9')
Figure 13:
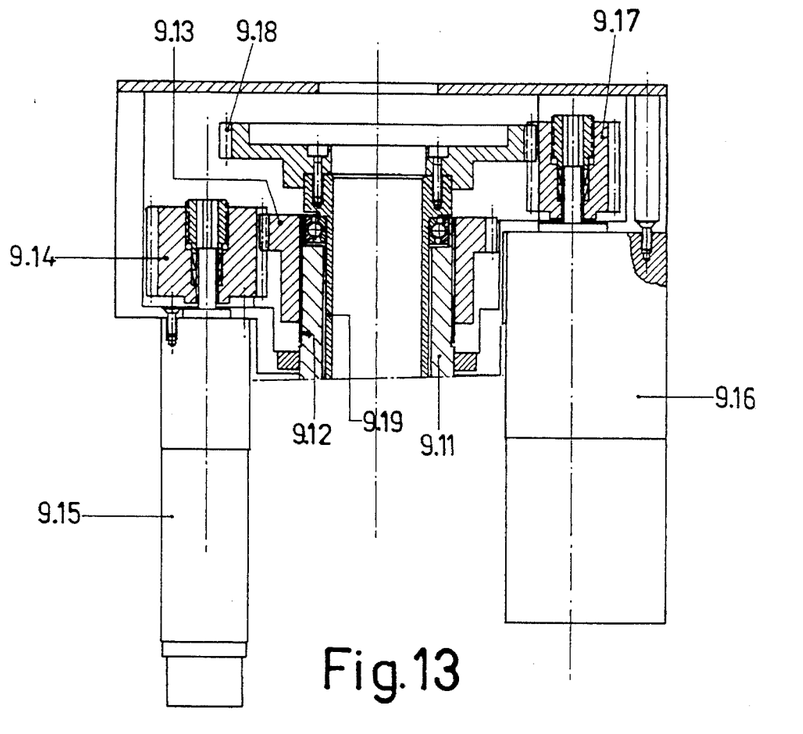
FIG. 13 shows the motors (9.15) and (9.16) of the cutting mechanism (9 or 9')

In FIGS. 11, 12 and 13 can be seen in detail the construction of each one of the two rotary cutting mechanism (9 and 9') which are identical. In the first place the movement of the whole mechanism in the transverse direction with respect to the band (1) is established through an endless screw mechanism (9.1) and its corresponding nut.

In the inside of the mechanism is housed a motor/reducer (9.2) which by means of the gears (9.3) and the bevel gears (9.4) makes a blade (9.5) rotate in either of two direction.

In accordance with the provision or the blade (9.5) to rotate in both as can be seen in FIG. 14, if the blade (9.5) advances towards the band (1) in the direction indicated by the arrow "A", on coming into contact with the first edge of the band (1) it must rotate in the direction indicated by the arrow "G.1" so that the fibres which make up the composite band (1.1) tend to go towards the inside and do not leave fringes or sharp ends on the edge of the band (1); as a result, the edge is the most perfect possible. But if this sense of rotation "G.1" is maintained, on arriving at the other edge of the band (1) the blade (9.5) would tend to pull the fibres towards the outside, which is not what is required. For this reason at a given moment during the cutting, the direction of rotation of the blade (9.5) is reversed and the blade will now begin to turn in the direction indicated by the arrow "G.2" so that on arriving at the final edge of the band (1) it tends to push the fibres of the composite band towards the inside, leaving the most perfect edge possible.

On the other hand the geometry of the blade (9.5) which is of a flattened truncated cone shape should also be emphasised; at its central cross-section it defines an isosceles trapezoidal figure, with a larger base (9.6), two inclined sides (9.7) and a smaller base (9.8). Then between the larger base (9.6) and the inclined sides (9.7) is defined the cutting edge (9.9) of the blade shown in FIG. 12.

The cutting edge (9.9) is aligned with the longitudinal axis (9.10) of the mechanism which permits the establishment with absolute precision of the cuts of the blade (9.5). But moreover, this particular geometry of the blade (9.5) means that by sharpening only the inclined part (9.7), the cutting edge (9.9) is always aligned with the shaft (9.10); in such a way that it is not necessary to make corrections.

This is a very important characteristic, since the composite band has an abrasive character and makes periodic sharpening of the cutting blades essential. In traditional solutions, each time that the cutting edge of a blade, defined between both planes, is sharpened, it varies in position and requires fresh adjustments, which makes manual sharpenings necessary. Now, with the solution recognised in the present invention, the blade (9.5) may be sharpened automatically, since said sharpening will only affect the inclined part (9.7) and the cutting edge (9.9) will invariably maintain its alignment with the axis (9.10).

On the other hand, the chassis (9.11) of the mechanism has an outer threaded area (9.12) with which a gear (9.13) coupled to a gear (9.14) of a motor (9.15) threadedly engages; in such a way that the rotation of this latter in one sense or another translates into the ascent or descent of the cutting blade (9.5).

Likewise there is a motor (9.16) which through the gears (9.17 and 9.18) communicates the rotation to an internal bushing (9.19) mounted between bearings. The rotation of the bushing (9.19) translates into the turning of the motor/reducer (9.2) with respect to the shaft (9.10) and with it, that of the blade (9.5).

In this way, the depth of the cut of the blade (9.5) is regulated by the motor (9.15) and its rotation by the motor (9.16).

Between the two rotary cutting mechanisms (9 and 9') is arranged the mechanical self centring device (8') whose construction is the same as that of device (8).

Figure 15:
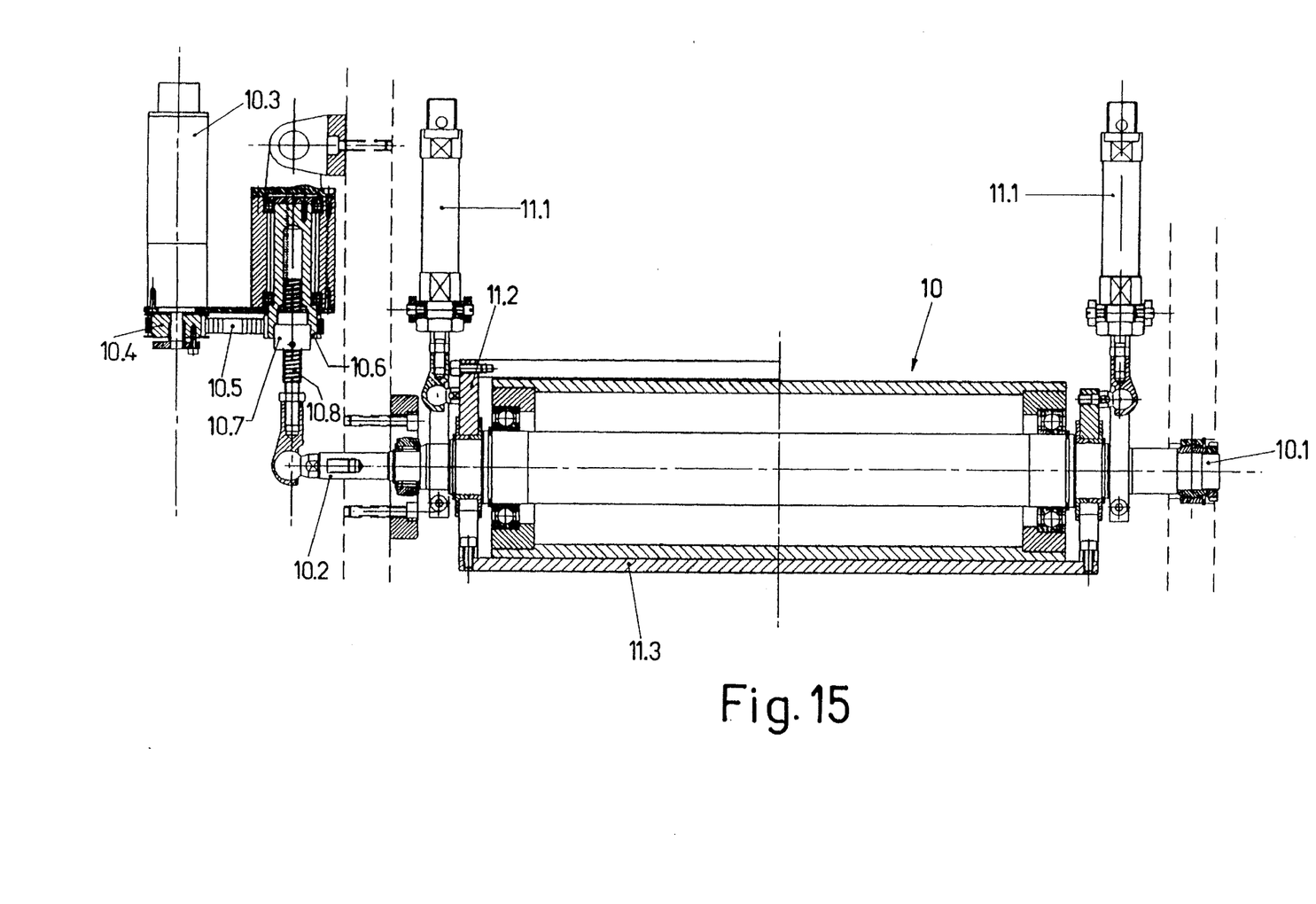
FIG. 15 is a view in longitudinal cross section of the centering roller (10) and of the mechanism (11) for removing waste from the composite.
Figure 16:
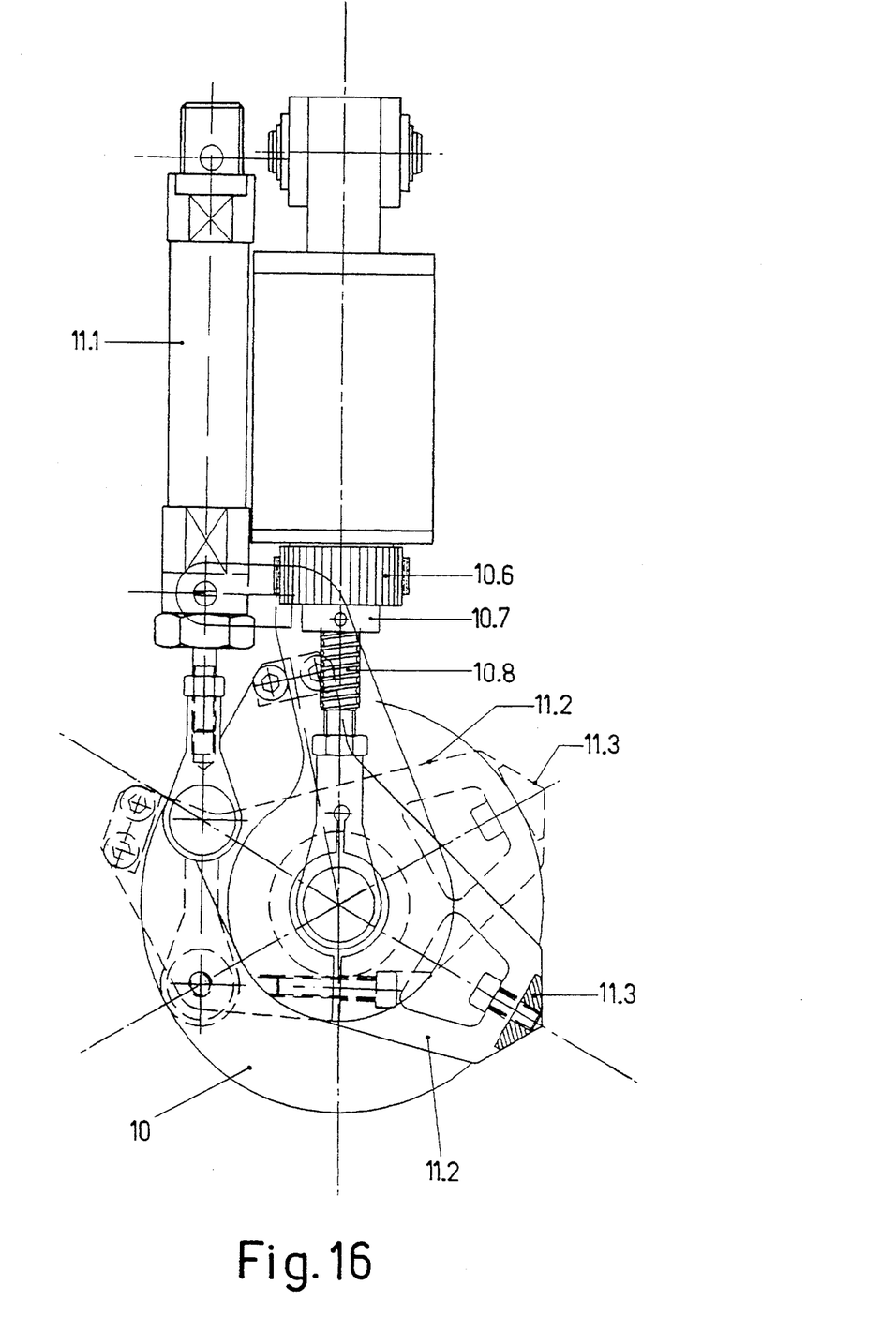
FIG. 16 is a view in profile of FIG. 15 if this were an unsectioned view.

In FIGS. 15 and 16 can be seen the construction of the centering roller (10), which at its end (10.1) is equipped with a spherical bearing; while at its end (10.2) it is coupled to a device which raises or lowers it from this end to centre thereby the band (1).

In effect, there exists a motor (10.3) which through the toothed pulley (10.4) and drive belt (10.5) transmits the rotation to a gear (10.6) on which is assembled a nut (10.7) screwed to a threaded stem (10.8). On activating the motor (10.3) in one sense or another the threaded stem (10.8) ascends or descends thus moving the end (10.2) of the roller (10).

On the shaft itself of the roller (10) is a mechanism (11) for removing composite waste (1.1). This mechanism (11) is made up of two cylinders (11.1) to whose cylinder rods are Joined a frame (11.2) which has a bar (11.3) with a triangular transverse cross section.

In the position of the cylinders (11.1), in which their rods are retracted, which corresponds with the position in FIG. 16, the bar (11.3) is inoperative. On activating the cylinders (11.1) provoking the extension of their rods, this makes the frame (11.2) turn with respect to the shaft of the roller (10), moving the bar (11.3) to the position shown in dash lines in FIG. 16.

In this case, the bar (11.3) enters into the path of the band (1) and by its geometry it makes the band (1) detach the waste from the composite (1.1) the waste being removed by a collector (15).

Figure 17:
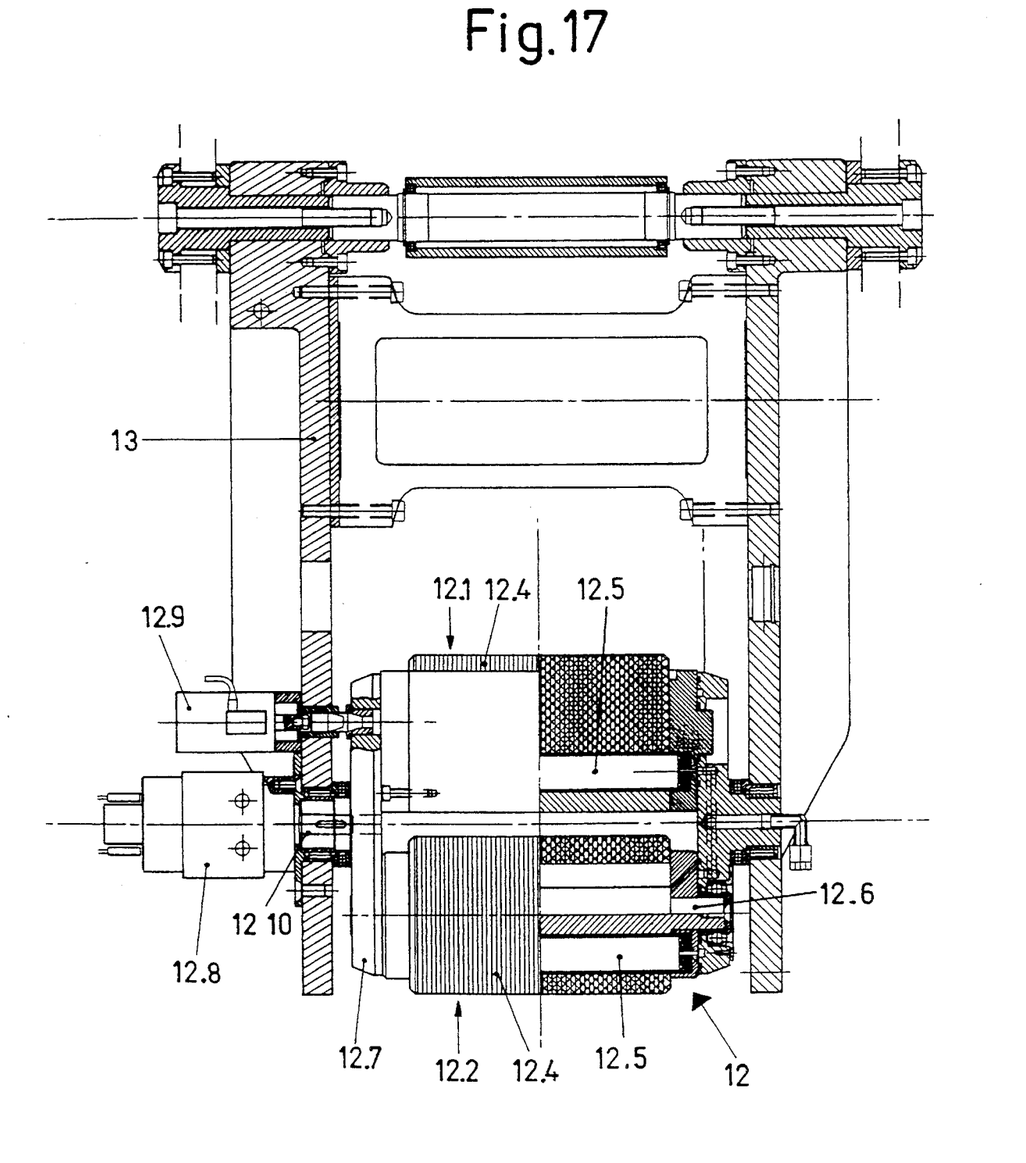
FIG. 17 is a front view partially in cross section of the frame (13) which carries the compacting means and (12.2)
Figure 18:
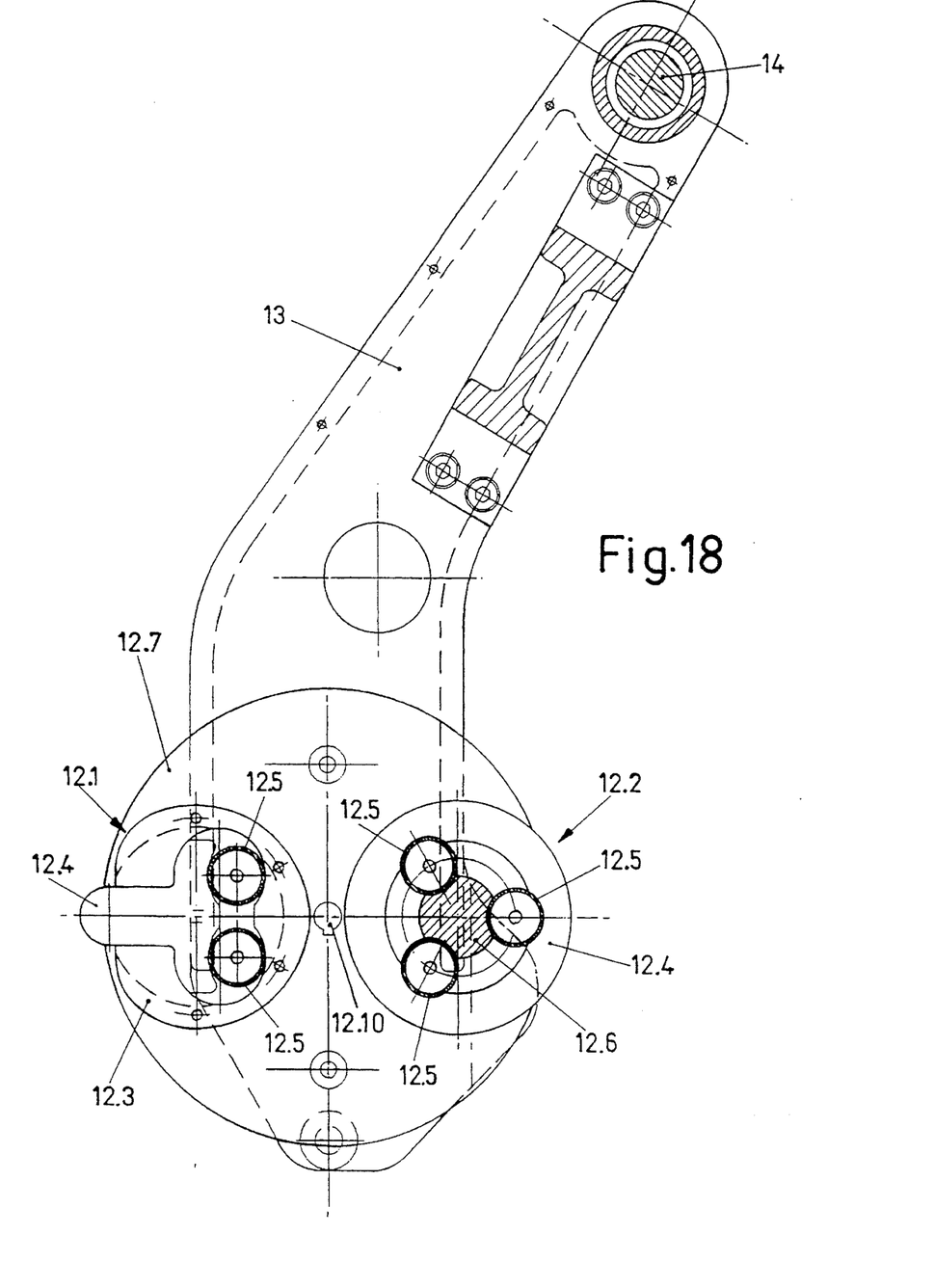
FIG. 18 is a view in profile of the frame (13)

Referring again to FIGS.2 and 3, following the roller (10) is the frame (13) of the compacting elements (12). As can be seen in FIGS. 17 and 18, the frame (13) holds the whole compacting assembly; in such a way that when the width of band (1) is changed; or even if it is necessary to change the compacting means (12) it is sufficient to release the shaft (14) and release the cylinder (16) also, in order for the whole frame (13) to come out as one assembly, thus being able to be substituted by another. (See FIGS. 2 and 18).

The cylinder (16) is subjected to a pressure greater than that of work; so that the frame (13) is maintained during work in a fixed position. If for any reason there occurs an incident of an unforeseen obstacle in the path of the compacting means (12), then the cylinder (16) is activated in order to avoid imperfections, lifting the frame (13) and stopping the whole system.

Figure 1:
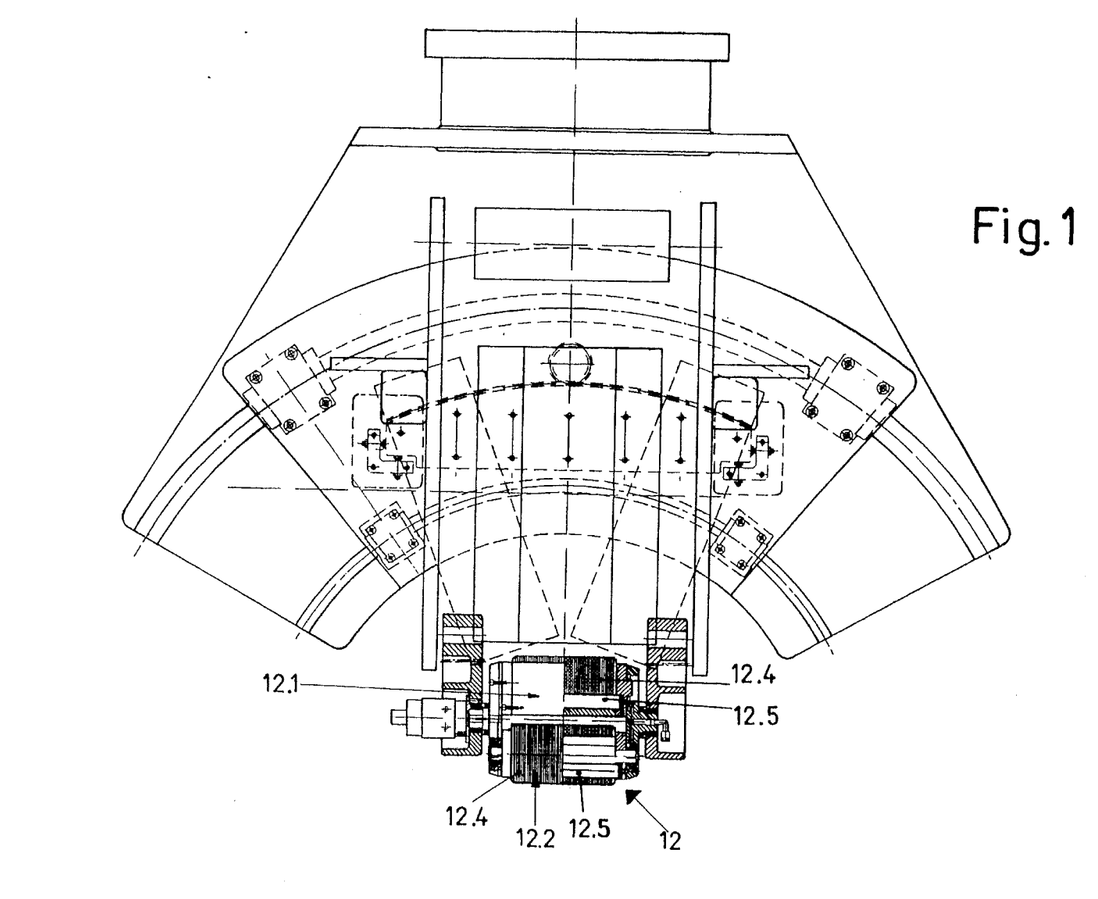
FIG. 1 is a front view of the head assembly in accordance with the invention, with a partial cross section in the part of the support for the compacting means (12)
Figure 2:
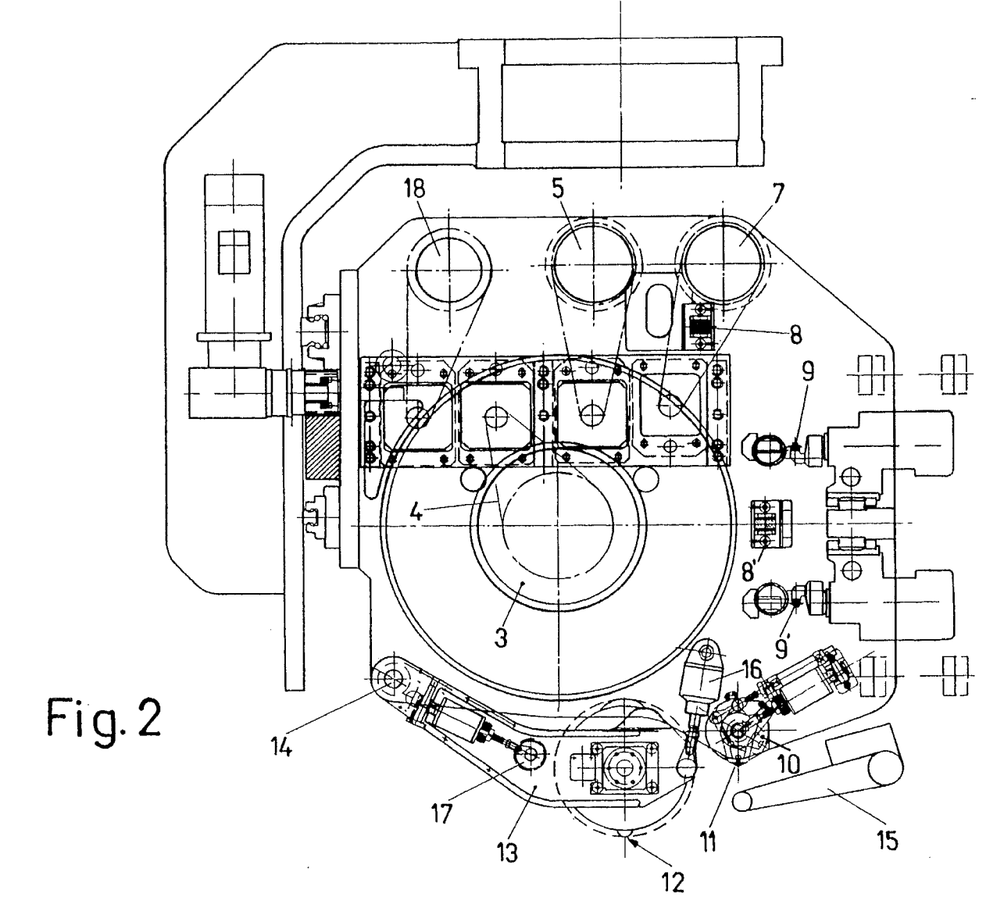
FIG. 2 is a side view of the head which is the object of the invention without the incorporation of the band (1)

In FIGS. 2 and 3 is shown, in the frame (13), another roller (17) whose structure is the same as that of the roller (10) and whose mission is to align the band of backing paper (1.2), when this exits without the composite (1.1), in order to direct it towards its spool (18). This roller (17) is optional.

In relation to the compacting means (12), in FIGS. 17, 18, 19 and 20 can be seen its construction, two variations of practical embodiments of the compacting rollers (12.1) being shown and (12.2).

Figure 19:
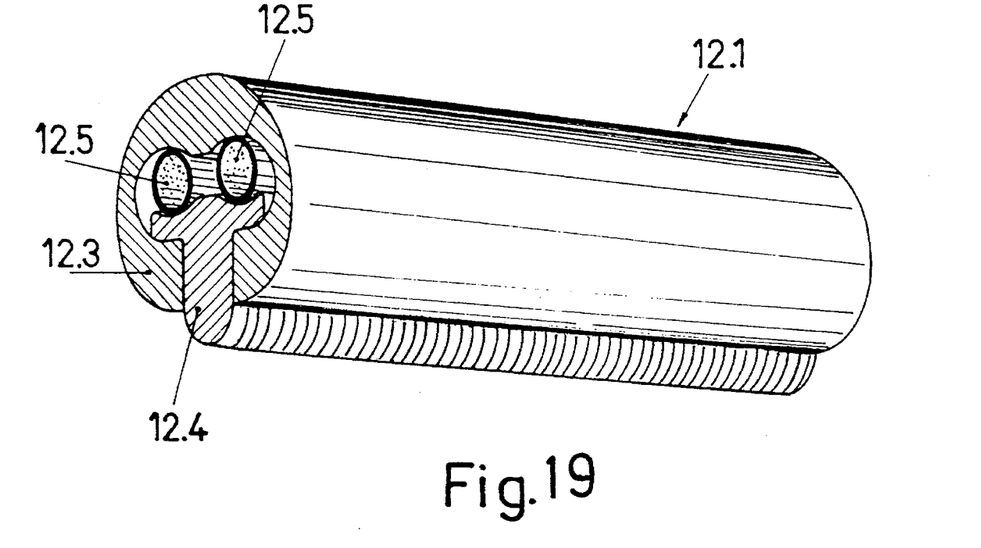
FIGS. 19 and 20 show, schematically and in perspective, the realisation of the compacting means (12.1) and (12.2).

Each compacting roller (12.1) is made up from a surrounding chassis (12.3), in whose interior are housed a multiplicity of identical pieces (12.4) which to impinge directly on the composite band, giving rise to its compacting. These pieces (12.4) may be metallic, synthetic components or of a material which is required as a result of the type of fibre to be compacted.

The pieces (12.4) are arranged in alignment, one next to the other, with the possibility of relative displacement between them by reciprocal slippage transverse of the alignment direction.

As can be seen in FIG. 19, each piece (12.4) has depressions on its periphery which in conjunction with other depressions on the chassis (12.3) give rise to cylindrical housings into which are introduced tubular pipes (12.5) of a synthetic material and having some elasticity.

Inside the tubular pipes (12.5) a pressurized fluid flows which, preferably, is a gas and specifically compressed air.

In this way, when the roller or rollers (12.1) are not working, the tubular pipes (12.5) fulfil the function of positioning lines which maintain the pieces (12.4) in a stable position, in which they are all aligned with each other.

On starting up the work phase, if, for example, the cloth to be fashioned has a curved surface, when the roller (12.1) passes over it, the convex parts of the said surface of the cloth will move the corresponding pieces (12.4) to a more recessed position than the rest; so that the attacking front of the assembly of pieces (12.4) forms a profile line coincident with that of the surface of the cloth to be fashioned.

The recessing of the pieces (12.4) causes the partial flattening of the tubular pipes (12.5) in such a way that when the profile of the surface of the cloth changes and at the roller (12.1) there is a perfectly flat area, the tubular pipes (12.5) recover their initial position elastically and also move the corresponding pieces (12.4) to their initial position, all the pieces (12.4) again becoming aligned as seen in FIG. 19.

It should be pointed out that the downward force which the pieces (12.4) exercise on the surface of the composite band (1.1) which is being compacted may vary selectively, by regulating the pressure of the fluid inside the tubular pipes (12.5).

In this way the downward force of the pieces (12.4) may be regulated selectively according to the characteristics such as the speed of work, the type of fibre to be compacted, the greater or lesser complexity of the forms of cloth etc.

Figure 20:
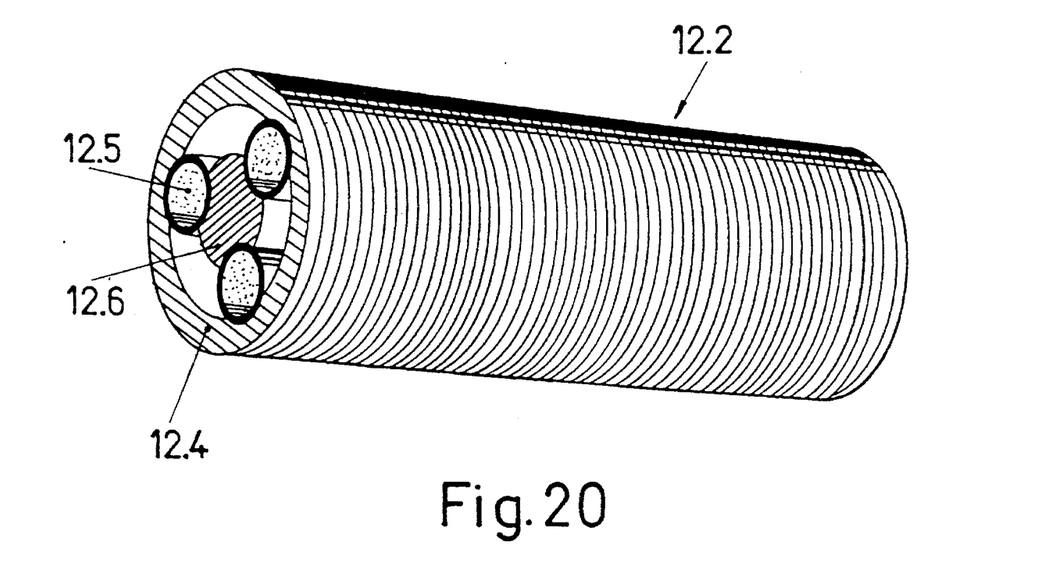

Compacting roller (12.2) is shown in FIG. 2. In accordance with this variation the pieces (12.4) have the shape of rings, the tubular pipes (12.5) being inside these rings (12.4).

In this case the outer chassis (12.3) is not required; but there exists instead a central shaft (12.6), in which are defined the depressions to receive portions of the tubular pipes (12.5).

It should be pointed out that with this solution, it follows that any area whatsoever of the periphery of the pieces (12.4) may be used as the attack front for compacting the fibre.

It is obvious that, as with this practical embodiment, there may be other variations which fall within the scope of the invention, as long as the fact remains that the different compacting pieces (12.4) are kept in their position through one or more tubular pipes (12.5), through whose interior passes a pressurised fluid.

The compacting rollers (12.1) are used when the cloths be to made have recesses or smaller radii. In either case, a head may have as compacting means a roller (12.1) and another roller (12.2) or even two of the same, in accordance with the requirements of the work.

The compacting rollers (12.1) and (12.2) are assembled on a support (12.7) solidly fixed to a central shaft (12.10), coupled to a motor (12.8). Thus the turning of the motor (12.8) is translated into the turning of the central shaft (12.10) and with it, into the turning of the support (12.7) in order thereby to situate one or the other of the rollers (12.1) and (12.2) in the lowered position or the non-operating position.

In FIG. 17 can be seen the existence of a locking cylinder (12.9) which locks the support (12.7) in the selected position.

The functioning of the head in its assembly is as follows: the loop (6) of the band (1) is made up in the manner of a store; in such a way that photocells detect its higher position and its lower position as limits in order to establish an acceleration or braking of the traction rollers (5 and 7).

Given that the weight of these rollers (5 and 7) is always constant, as is the portion of the band (1) arranged on them, the necessary calculations may be made at any given moment so that the tension of the band (1) leaving the roller (7) is constant.

The aligning tools (8, 8'and 10) ensure that the band (1) runs perfectly centred, even after the rotary cutting mechanisms (9 and 9') have been activated.

The arrangement of the compacting rollers (12.1 and 12.2) in diametrical opposition on a gyratory support (12.7) allows one to select the most ideal position of these in each phase of work, from the initial threading up to compacting.

When it is wished to remove part of the composite strip (1.1) it is sufficient to turn the profile (11.3) to the position in which the waste pieces may be detached and withdrawn by the collector (15).

The band of backing paper (1.2) already clean leaves the area of the compacting rollers (12.1 and 12.2) in order to be aligned by the roller (17) if provided, and collected in the rewinder (18).

I claim:

1. A head for the application of composite bands, comprising:

a compacting apparatus for pressing on a composite band so that the composite band substantially conforms with a workpiece to which it is applied;

said compacting apparatus comprising at least one engaging device;

a movable support for mounting said engaging device;

said engaging device comprising a plurality of substantially identical pieces in adjacent relationship, said pieces being transverse of said engaging device;

said pieces being substantially in alignment along the engaging device and each being free to move transversely thereof;

at least one elastic element extending along and in engagement with said pieces for yieldingly resisting transverse movement of said pieces;

a spool holder for holding a spool of a composite band;

a first motorized roller for receiving the composite band from the spool holder;

a second motorized roller in spaced relation to said first motorized roller, to receive the composite band from said first motorized roller to thereby form a loop in said composite band between said motorized rollers;

at least one of said motorized rollers having a first set of conduits linearly extending along said roller, and a first set of branch conduits connected to said first set of linearly extending conduits and extending substantially to the surface of said roller in zones adjacent the two ends thereof; and a second set of linearly extending conduits in said roller, and a second set of branch conduits connected to said second set of linearly extending conduits and extending substantially to the surface of said roller in a zone intermediate the zones adjacent the two ends of said roller; and whereby said pieces can be transversely moved by irregularities in the work and with elastic yield of said elastic element.

2. The head as claims in claim 1, said engaging device comprising a housing having a longitudinally extending opening, said pieces lying partially within said housing and having portions extending through said opening, said elastic element lying between an abutment in said housing and said pieces.

3. The head as claimed in claim 2, and further comprising a journal, said movable support being rotatably mounted on said journal, said head comprising a frame, a linear motor journaled on said frame and connected to said movable support for causing movement of said movable support.

4. The head as claimed in claim 2, and further comprising a rotary cutting apparatus, said rotary cutting apparatus comprising:

a rotary blade, a drive apparatus for said rotary blade driving said rotary blade selectively in a first direction of rotation and in a second opposite direction of rotation and moving said rotary blade transversely across the path of said composite band to cut said composite band, said rotary blade driving apparatus driving said rotary blade in a first direction prior to or upon engaging said composite band and driving said rotary blade in the opposite direction it leaves the composite band, apparatus for regulating the depth of cut and orientation of the rotary blade, and means for automatically sharpening said blade.

5. The head as claimed in claim 4, wherein said rotary blade has the shape of a truncated cone having a first larger base and a second smaller base, said bases being substantially parallel, and a conical surface between said bases, the rotary blade having a cutting edge at the juncture of said conical surface and the larger of said bases, said rotary blade being mounted for rotation about the axis of said truncated cone.

6. The head as claimed in claim 1, and further comprising:

means for adjusting the relative distance between said first and second rollers, at least one of said first and second rollers having a controlled shaft, whereby to provide information to a system for receiving such information.

7. The head as claimed in claim 1, and further comprising a self-centering apparatus for centering the composite band, and comprising:

a pair of spaced rollers, a belt trained on said rollers for movement thereon and having first and second runs, first and second lateral guides for said composite band in laterally spaced apart relation, a first of said guides secured to one run of said belt and the other of said guides secured to the other run of said belt.

8. The head as claimed in claim 1, and further comprising:

a centering roller for said composite band, said centering roller having a spherical bearing at one end, a raising and lowering apparatus connected to the opposite end of said roller for thereby moving said roller about said spherical bearing, said roller having a shaft, and a frame on said shaft, said frame supporting a bar of triangular profile substantially parallel to said shaft, and means for shifting said frame so as to cause said triangular bar to be engaged with or disengaged from said composite band, whereby said triangular bar may remove waste material from said composite band.

9. The head as claimed in claim 8, and further comprising:

a waste collector positioned to receive and collect waste removed from the composite band by said bar.

* * * * *